(12) United States Patent
Cheng

(10) Patent No.: US 6,643,744 B1
(45) Date of Patent: Nov. 4, 2003

(54) METHOD AND APPARATUS FOR PRE-FETCHING AUDIO DATA

(75) Inventor: Howard H. Cheng, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 303 days.

(21) Appl. No.: 09/643,984

(22) Filed: Aug. 23, 2000

(51) Int. Cl.[7] .............................................. G06F 12/00
(52) U.S. Cl. ....................... 711/137; 711/213; 711/218; 711/169; 712/210
(58) Field of Search ................................ 711/212, 213, 711/217, 218, 137, 169, 1, 5, 220; 700/94; 712/210

(56) References Cited

U.S. PATENT DOCUMENTS

| | | | |
|---|---|---|---|
| 4,951,246 A | * 8/1990 | Fromm et al. ............... 711/169 |
| 5,177,701 A | * 1/1993 | Iwasa ......................... 712/210 |
| 5,239,654 A |   8/1993 | Ing-Simmons et al. ....... 712/20 |
| 5,471,450 A |  11/1995 | Yonemitsu et al. ........... 369/60 |
| 5,471,600 A | * 11/1995 | Nakamoto ..................... 711/5 |
| 5,553,220 A |   9/1996 | Keene ......................... 345/520 |
| 5,607,356 A |   3/1997 | Schwartz ..................... 463/31 |
| 5,659,698 A | * 8/1997 | Weng et al. ................. 711/220 |
| 5,689,080 A |  11/1997 | Gulick ......................... 84/604 |
| 5,732,224 A |   3/1998 | Gulick et al. ............... 710/100 |
| 5,753,841 A |   5/1998 | Hewitt ......................... 84/604 |
| 5,763,801 A |   6/1998 | Gulick ......................... 84/604 |
| 5,799,150 A |   8/1998 | Hamilton et al. ........... 709/203 |
| 5,809,342 A |   9/1998 | Gulick ......................... 395/884 |
| 5,813,027 A |   9/1998 | Lahti et al. ................. 711/118 |
| 5,822,537 A |  10/1998 | Katseff et al. .............. 709/231 |
| 5,835,944 A |  11/1998 | Lahti et al. ................. 711/118 |
| 5,847,304 A |  12/1998 | Hewitt ......................... 84/622 |
| 5,860,076 A | * 1/1999 | Greene et al. ................. 711/1 |
| 5,895,469 A |   4/1999 | Lahti et al. ................. 395/872 |
| 5,897,437 A |   4/1999 | Nishiumi et al. ............. 463/47 |
| 5,966,182 A |  10/1999 | Yonemitsu et al. ......... 348/423 |
| 5,977,997 A |  11/1999 | Vainsencher ................ 345/519 |
| 5,990,902 A |  11/1999 | Park ........................... 345/430 |
| 6,008,446 A |  12/1999 | Van Buskirk et al. ........ 84/603 |
| 6,016,522 A |   1/2000 | Rossum ....................... 710/52 |
| 6,047,365 A |   4/2000 | Chambers et al. .......... 711/220 |
| 6,092,154 A |   7/2000 | Curtis et al. ................ 711/137 |
| 6,100,461 A |   8/2000 | Hewitt ......................... 84/603 |
| 6,119,217 A |   9/2000 | Suzuoki ....................... 712/36 |
| 6,124,868 A |   9/2000 | Asaro et al. ................ 345/513 |
| 6,137,043 A |  10/2000 | Rossum ....................... 84/603 |
| 6,137,046 A |  10/2000 | Kamiya ....................... 84/604 |
| 6,138,183 A |  10/2000 | Tien et al. .................. 710/22 |
| 6,141,025 A |  10/2000 | Oka et al. ................... 345/521 |
| 6,148,439 A |  11/2000 | Nishiyama .................... 717/9 |
| 6,166,748 A |  12/2000 | Van Hook et al. .......... 345/522 |
| 6,173,381 B1 |  1/2001 | Dye ............................ 711/170 |
| 6,195,736 B1 |  2/2001 | Lisle .......................... 711/206 |
| 6,239,345 B1 |  5/2001 | Laroche ....................... 84/604 |

FOREIGN PATENT DOCUMENTS

WO    WO 94/10641    11/1994

* cited by examiner

*Primary Examiner*—Donald Sparks
*Assistant Examiner*—Brian R. Peugh
(74) *Attorney, Agent, or Firm*—Nixon & Vanderhye, PC

(57) ABSTRACT

An audio system includes a memory storing audio data and an audio signal processor for processing the audio data. Addressing circuitry addresses the memory and a pre-fetch storage area stores data for a current address and for one or more following addresses to hide memory access latency during address changes of the addressing circuitry.

33 Claims, 15 Drawing Sheets

AUDIO SAMPLE

POSITION IS REWOUND TO LOOP
POSITION WHEN END IS REACHED

A START COMMAND STARTS PLAYBACK
...PLAYBACK STOPS WHEN END IS REACHED
OR A STOP COMMAND IS EXECUTED

LOOPED PLAYBACK

Fig. 5  EXAMPLE GRAPHICS PROCESSOR FLOW

METHOD AND APPARATUS FOR PRE-FETCHING AUDIO DATA

RELATED APPLICATIONS

This application is related to application Ser. No. 09/643,981, entitled "Method and Apparatus for Mixing Sound Signals", the contents of which are hereby incorporated by reference.

FIELD OF THE INVENTION

The present invention relates to a method and apparatus for pre-fetching data, and more particularly, to pre-fetching audio data for use by an audio signal processor.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

Interactive 3D computer graphics systems are often used to play video games. The "gaming experience" however typically involves more than just video content. For example, almost all gaming experiences involve audio content that accompanies the video content. The audio subsystem described herein enables sound emitters to be placed in three-dimensional space and provides a powerful means of generating psycho-acoustic 3D sound effects with a pair of speakers. The audio subsystem includes an audio memory that is usable, for example, to store sound samples, instrument wave tables, audio tracks and the like read from a mass storage device such as a DVD. The samples, wave tables, tracks, etc. are subsequently read out and processed by an audio digital signal processor to produce the game audio content. This content is transferred to a main memory from where it is subsequently read out for supply to a decoder and output to speakers. The separate audio memory improves the access for the audio processing circuitry to audio data by avoiding the need to contend with other resources (e.g., the graphics subsystem) attempting to access the main system memory.

A wavetable refers to a table of pre-recorded sound waves (e.g., for an instrument such as a piano) stored in a memory. Typically, these sounds are stored as files in a particular format (e.g., WAV or AIFF). Sound files may be played from beginning to end as shown in FIG. 12A or sound files may be provided with loop points so that they loop as specified (possibly with envelope reduction) until stopped as shown in FIG. 12B. Providing loop points permits sound files to be smaller because portions of the files are replayed. However, while permitting reduced sound file sizes, looping causes memory addressing problems because of the need to jump back to the loop point. Memory addressing generally is most efficient when the next address for data read out is obtained by incrementing the current address. However, looping requires that address registers for addressing the memory in which the sound files are stored be reset one or more times to the loop point. While incrementing address registers to read the data at the next file address can be performed quickly, resetting the registers takes a longer time and can result in a latency period between the output of data at the last pre-loop-back address and the output of data at the loop-back address. This can result in interruptions in the audio output and adversely impact the player's gaming experience.

In accordance with one aspect of the present invention, the possibility of corrupted audio is minimized by pre-fetching audio data. Because pre-fetched data is already present when the address registers are re-set, the audio digital signal processor can continue reading data during the latency period. In one example, an audio system includes a memory storing an audio file and an audio signal processor for processing the audio file. Addressing circuitry addresses the memory and a pre-fetch storage area stores data for a current address and for one or more following addresses to hide memory access latency during address changes of the addressing circuitry.

BRIEF DESCRIPTION OF THE DRAWINGS

These and other features and advantages provided by the invention will be better and more completely understood by referring to the following detailed description of presently preferred embodiments in conjunction with the drawings, of which.

DETAILED DESCRIPTION OF EXAMPLE EMBODIMENTS OF THE INVENTION

Figure 1:
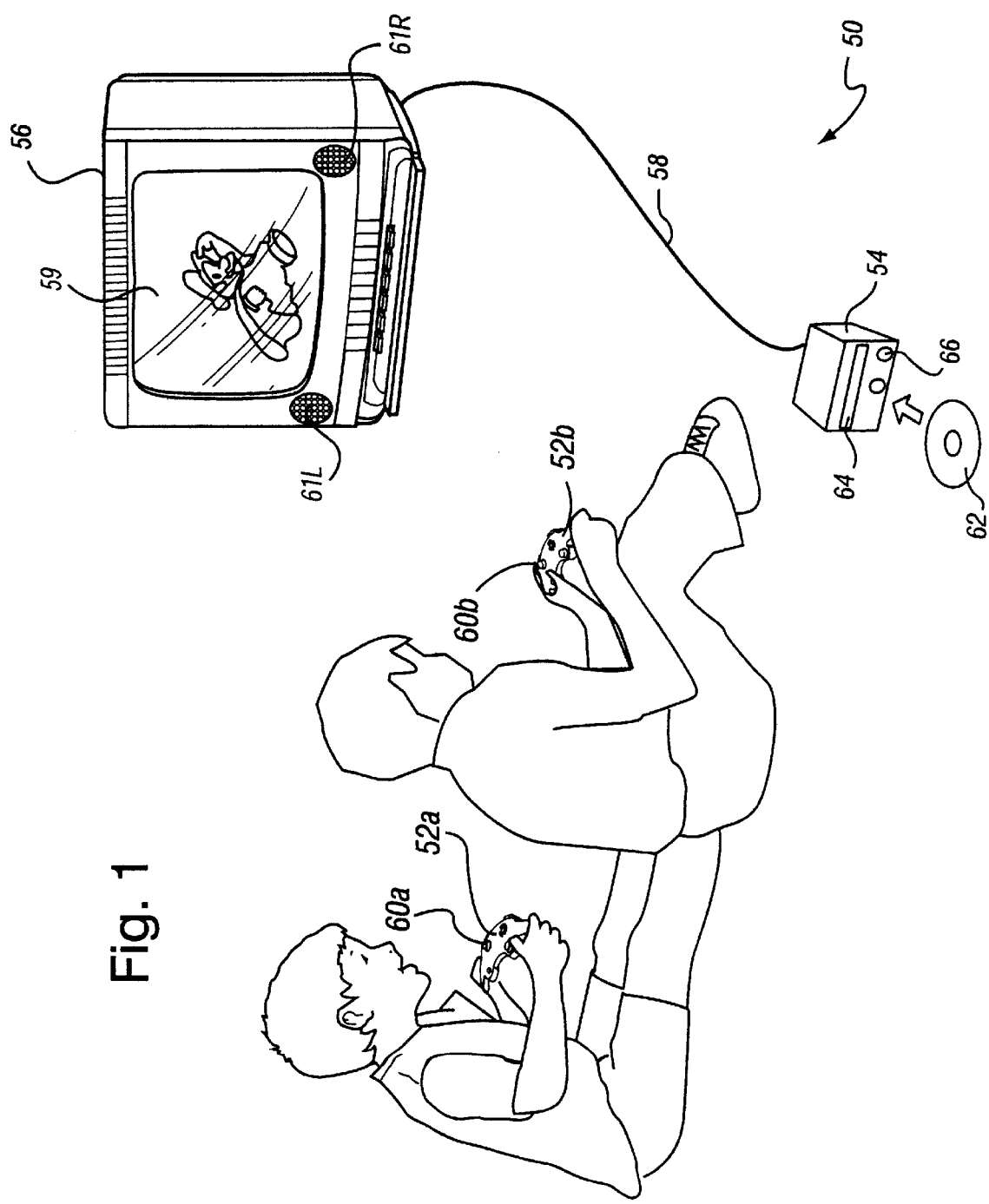
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52*a*, 52*b* or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52*a*, 52*b* to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
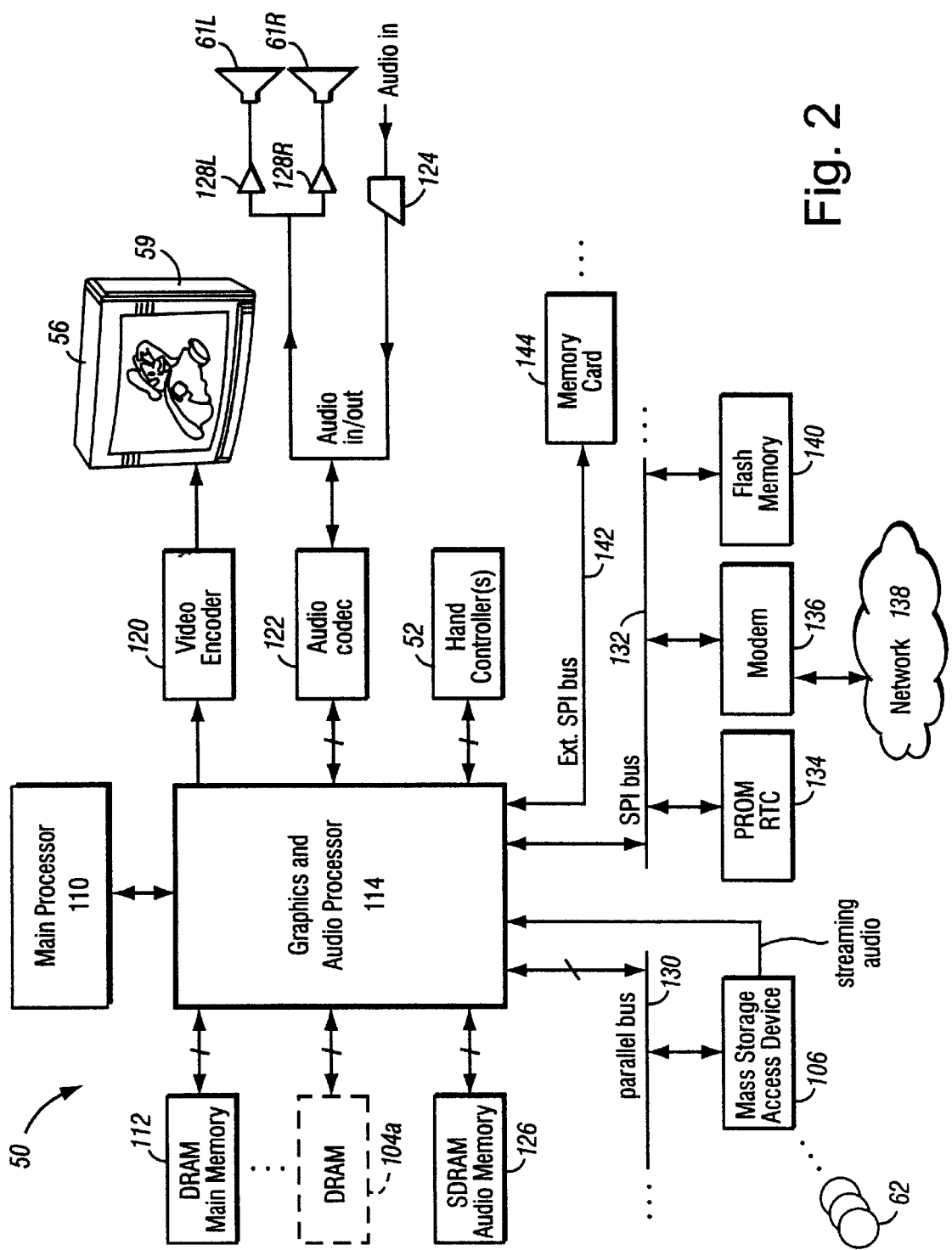
FIG. 2 is a block diagram of the FIG. 1 example computer graphics system.

FIG. 2 shows a block diagram of example components of system 50. The primary components include:
- a main processor (CPU) 110,
- a main memory 112, and
- a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signal to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
- a programmable read-only memory (PROM) and/or real time clock (RTC) 134,
- a modem 136 or other networking interface (which may in turn connect system 50 to a telecommunications network 138 such as the Internet or other digital network from/to which program instructions and/or data can be downloaded or uploaded), and
- a flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
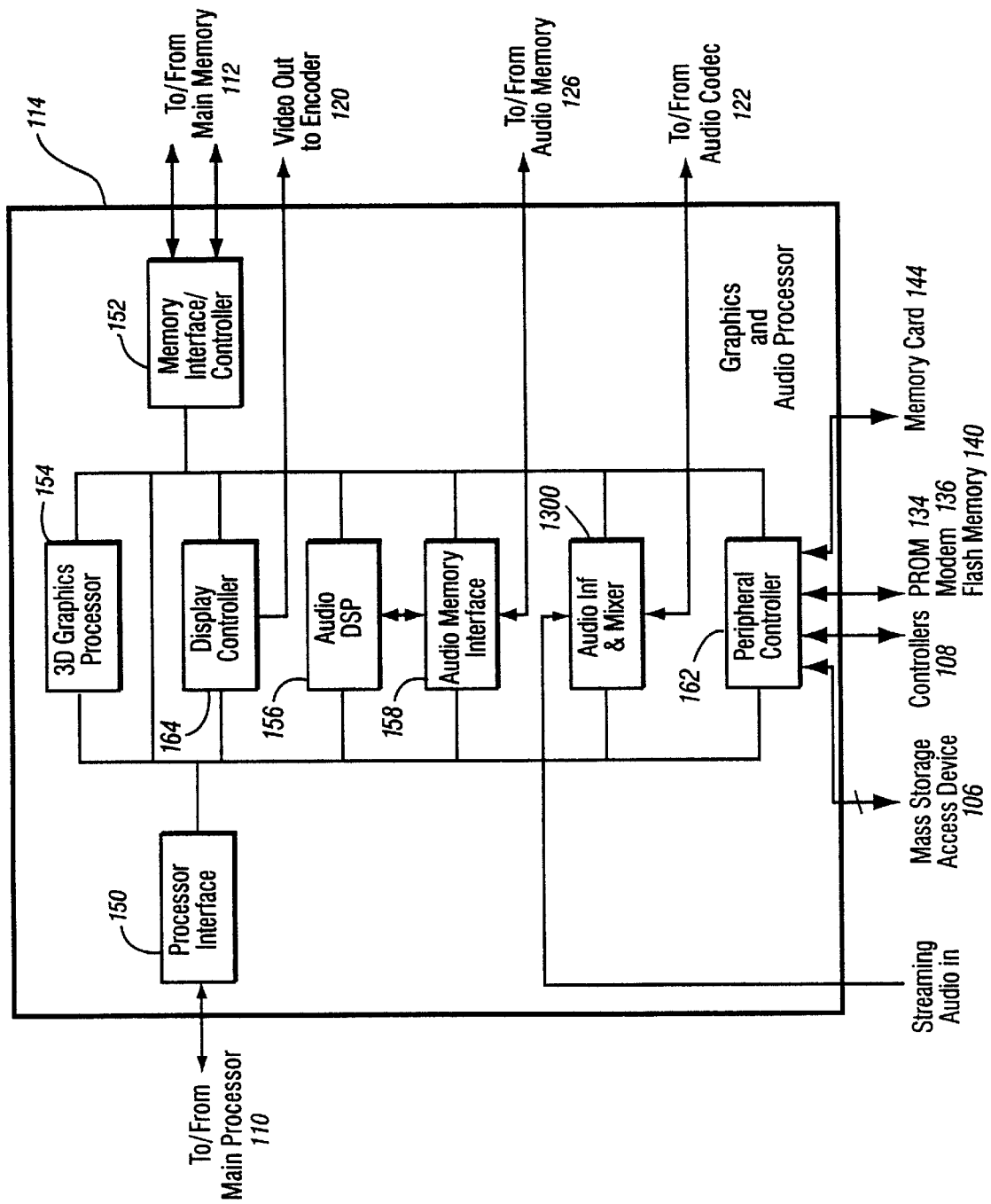
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150, a memory interface/controller 152, a 3D graphics processor 154, an audio digital signal processor (DSP) 156, an audio memory interface 158, an audio interface and mixer 160, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
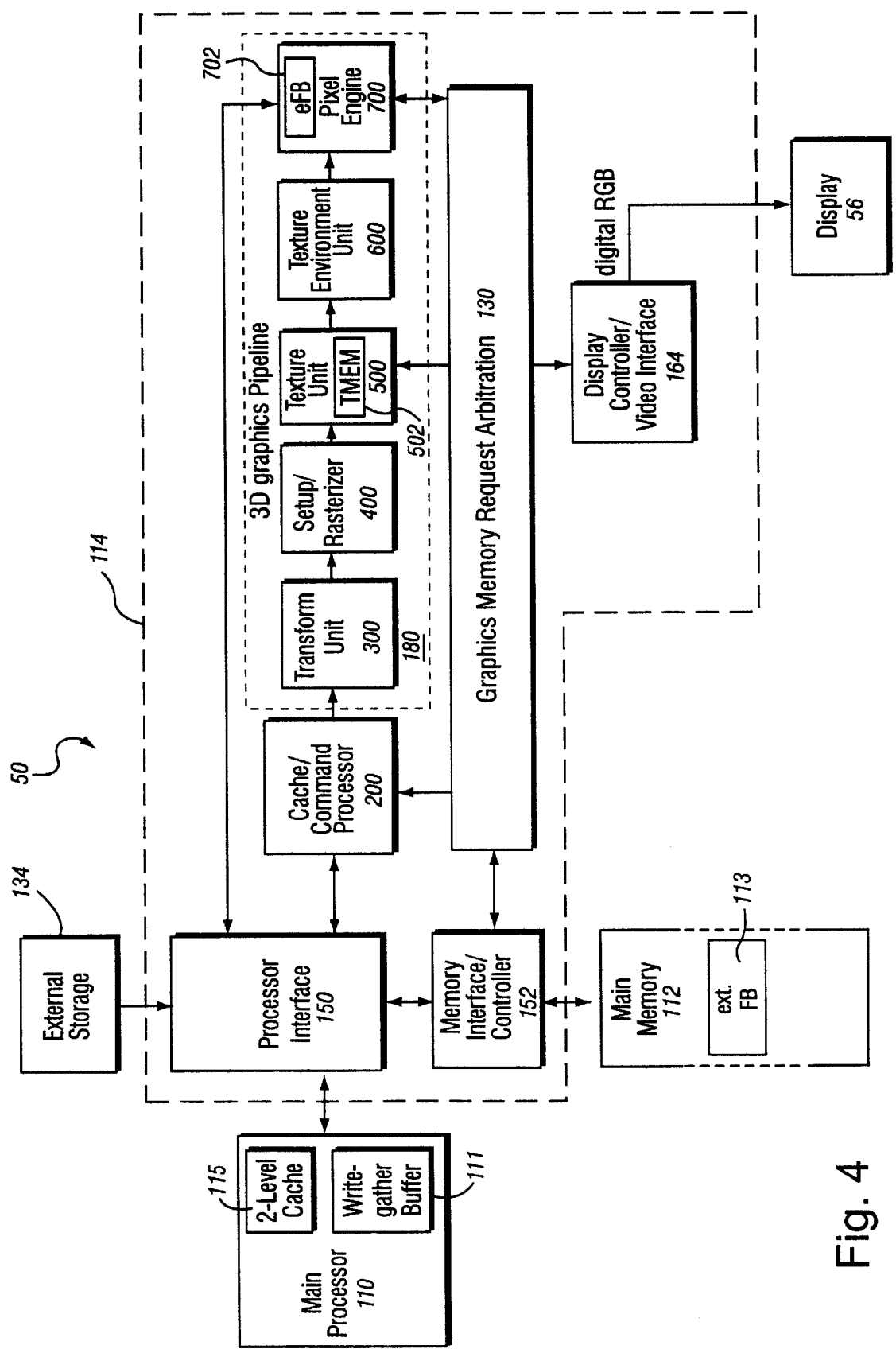
FIG. 4 is a block diagram of the example 3D graphics processor shown in FIG. 3.

FIG. 4 shows a graphics processing system including a more detailed view of an exemplary FIG. 3 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112 via memory controller 152. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56. these commands. The resulting image information may be transferred to main memory 112 for access by display controller/ video interface unit 164—which displays the frame buffer output of pipeline 180 on display 102.

Figure 5:
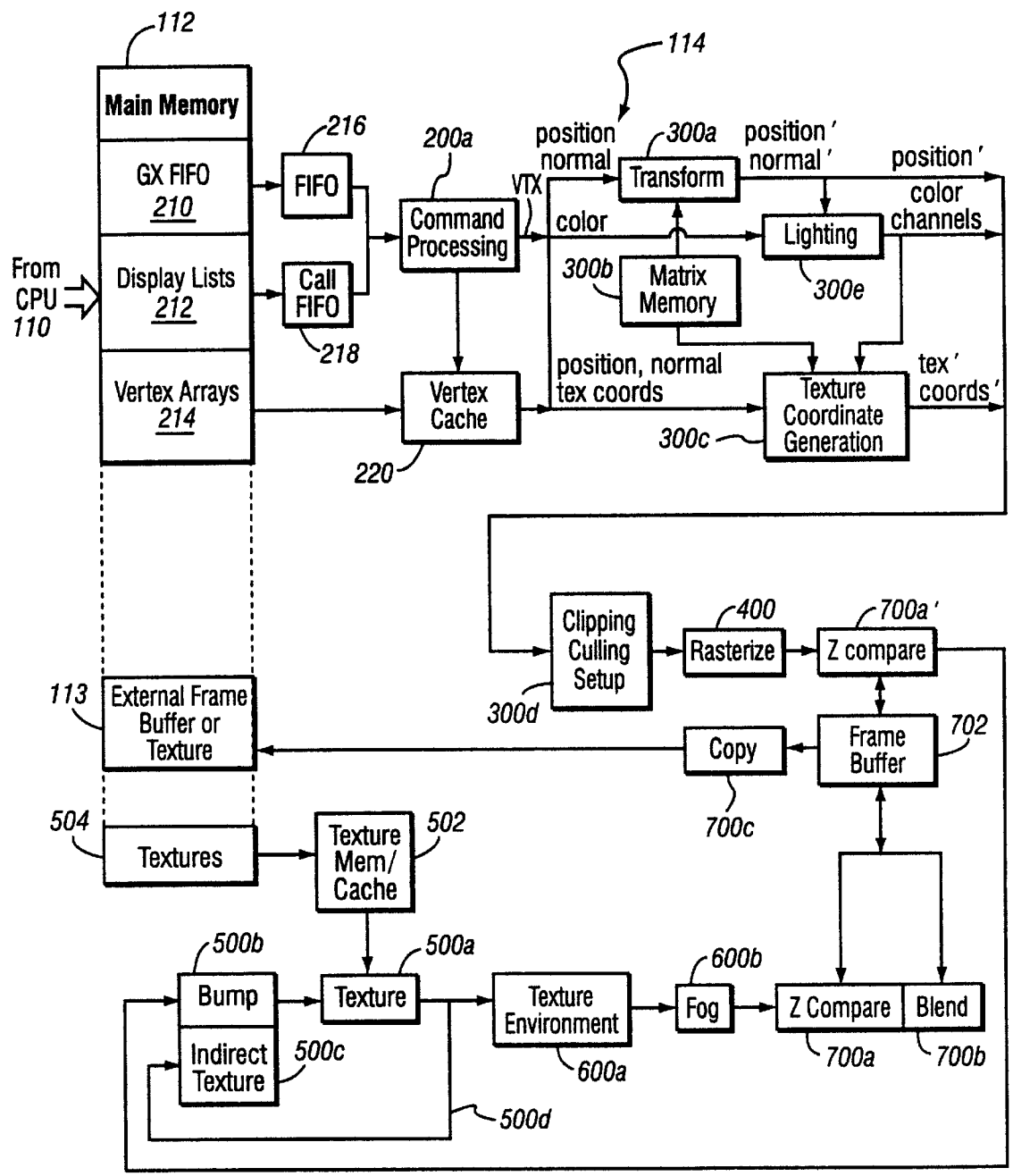
FIG. 5 is an example logical flow diagram of the FIG. 4 graphics and audio processor.

FIG. 5 is a block logical flow diagram portraying illustrative processing performed using graphics processor 154.

Main processor 110 may store graphics command streams 210, display lists 212 and vertex arrays 214 in main memory 112, and pass pointers to command processor 200 via bus interface 150. The main processor 110 stores graphics commands in one more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500a) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to memory portion 113 of main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 56.

Example Audio System

Audio DSP 156 performs pitch modulation and the mixing of voices and effects data. Audio DSP 156 is augmented by a large quantity (e.g., 16 MB or more) of audio memory 126 (Auxiliary RAM—ARAM) which may be used to store audio-related data such as audio samples. Audio is routed to speakers 61L and 61R via audio codec 122 which includes a digital-to-analog converter. Streaming audio from mass storage device 62 provides an efficient method for reproducing high-fidelity audio during game runtime.

Figure 6:
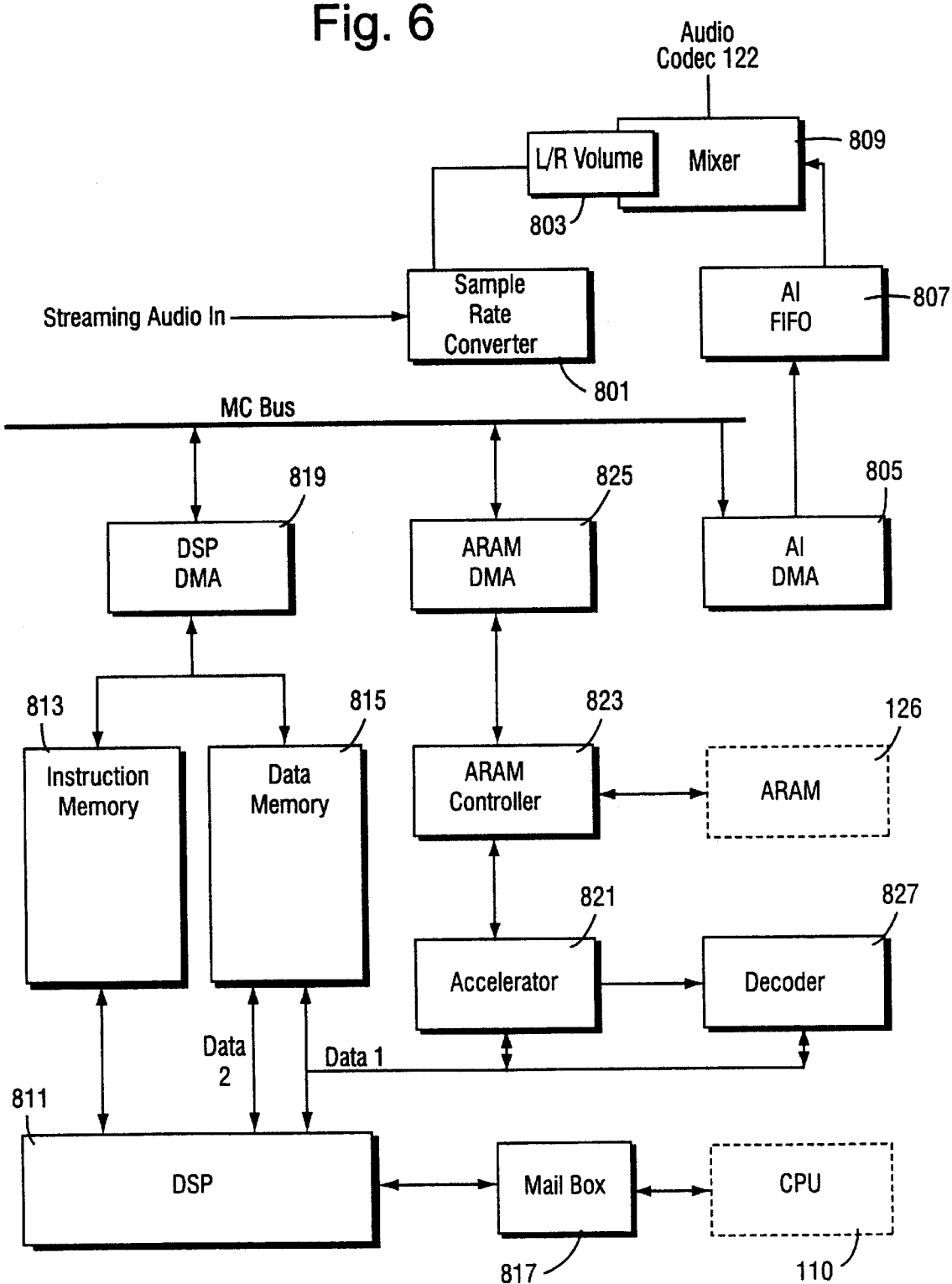
FIG. 6 is a more detailed block diagram of audio DSP 156, audio memory interface 158 and audio interface and mixer 160 shown in FIG. 3.

FIG. 6 is a more detailed block diagram of audio DSP 156, audio memory interface 158 and audio interface and mixer 160 shown in FIG. 3. A sample rate converter 801 samples streaming audio (which may be from mass storage device 62) at either 48 kHz or 32 kHz and L/R volume control 803 controls the left- and right-channel volume levels of the sampled audio. The streaming audio bypasses main memory 112 entirely, thereby conserving memory and processor bandwidth. In cases in which audio data on mass storage device 62 is encoded, for example, in ADPCM format, mass storage access device 106 automatically decodes the ADPCM data into PCM samples (e.g., 16 bits) for supply to sample rate converter 801.

A DMA (Direct Memory Access) channel 805 enables the transfer of data from an arbitrary location in main memory 112 to FIFO buffer 807. Mixer 809 mixes the outputs of sample rate converter 801 and FIFO buffer 807 and the result is output to audio codec 122. The sampling rate of audio codec 122 is, for example, 48 kHz and audio codec 122 may be a standard SigmaDelta codec for converting stereo, 16-bit PCM into an analog signal.

DSP core 811 has a 100 MHz instruction clock and uses 16-bit data words and addressing. DSP core 811 uses a word (16-bit) addressable instruction memory 813 that includes a RAM area (e.g., 8 kbyte) and a ROM area (e.g., 8 kbyte) and a word addressable data memory 815 that includes a RAM area (e.g., 8 kbyte) and a ROM area (e.g., 4 kbyte). A DSP DMA 819 is provided to transfer data from/to main memory 112 to/from the DSP data/instruction RAM areas or from the DSP data/instruction ROM areas to main memory 112. There are two requestors of access to instruction memory 813: DSP DMA 819 and DSP 811. The instruction RAM area can be read/write by DSP DMA 819 and can only be read by DSP 811. The instruction ROM area can only be read by DSP 811. There are three requestors of access to data memory 815: DSP DMA 819, data bus 1 and data bus 2. Mail box registers 817 are provided for communication with the main processor 110. Mail box registers 817 may include a first mail box register for communications from main processor 110 to DSP core 811 and a second mail box register for communications from DSP core 811 to main processor 110. Each register is, for example, 32-bits wide. An accelerator 821 is usable instead of DSP core 811 to read from and write to audio memory 126. A memory controller 823 is provided for audio memory 126 and is operative, among other things, to arbitrate requests for audio memory access between DSP core 811 and a dedicated DMA channel 825 controlled by main processor 110 for data transactions between audio memory 126 and main memory 112. Generally, data transactions between audio memory 126 and DSP data memory 815 have priority over DMA channel 825. A decoder 827 decodes audio samples supplied thereto. Audio memory 126 is intended primarily for the storage of audio-related data and may comprise 16 MB of RAM (expandable up to a total of 48 MB).

To help reduce audio data storage requirements, various compression and decompression schemes may be utilized. ADPCM refers to adaptive differential PCM. This scheme may be used to compress/decompress sounds generated by the audio subsystem described above and to compress/decompress sounds on mass storage device 62. Various ADPCM algorithms exist and it is not necessary that the same algorithm be used for the sounds generated by the audio subsystem and the sounds on mass storage device 62. Decoder 827 provides runtime ADPCM decompression of sound data generated by the audio subsystem and mass storage access device 106 provides runtime ADPCM decompression of sound data from mass storage device 62. An 8-bit PCM compression/decompression scheme may also be used for sound data generated by the audio subsystem. Thus, decoder 827 also provides runtime decompression of 8-bit PCM-compressed sound data. Of course, the mentioned compression/decompression schemes are provided by way of illustration, not limitation.

During system initialization, a runtime audio library is downloaded to audio DSP 156. This audio library is used by audio DSP 156 to process and mix voices in accordance with commands in a command list generated by main processor 110. The command list is stored in main memory 112. Audio DSP 156 retrieves the commands from main memory 112 and executes them in accordance with the runtime audio library downloaded thereto.

The audio subsystem permits placing of sound emitters in three-dimensional space. This is achieved with the following features:

Volume and panning control
Pitch modulation (for Doppler effect)
Initial time delay (phase shift between left and right channels)
FIR filter (for HRTF and environmental effects)

Together these features provide a powerful means of generating psycho-acoustic three-dimensional sound effects with a pair of speakers.

Figure 7:
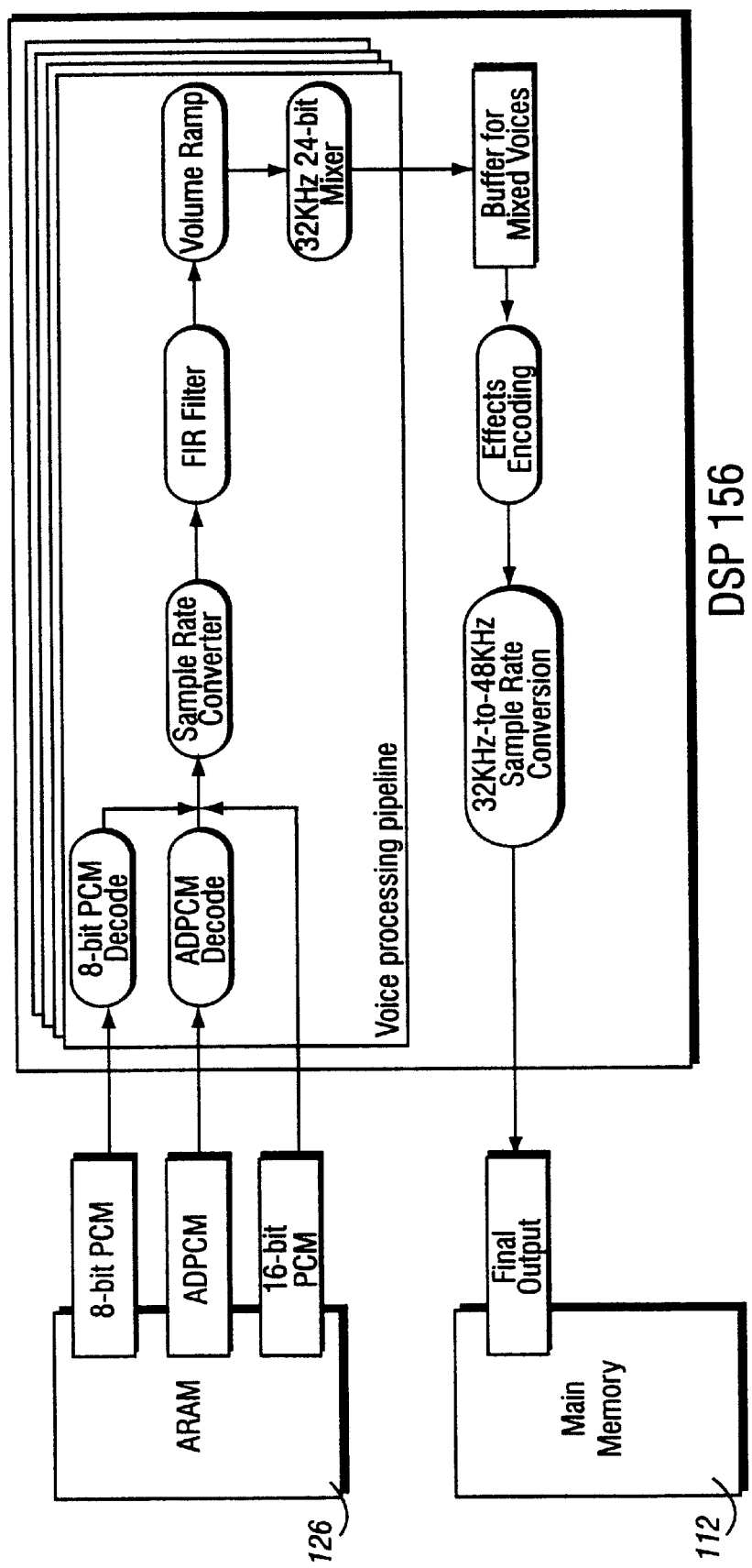
FIG. 7 shows processing steps of audio DSP 156.

The voice processing pipeline is shown in FIG. 7:
1. Samples are read from audio memory 126 by audio DSP 156.
2. ADPCM and 8-bit PCM samples from audio memory 126 are decoded and the decoded samples are supplied to a first sample rate converter.
3. 16-bit PCM samples from audio memory 126 are passed directly to the first sample rate converter.
4. The sample rate converter adjusts the pitch of the incoming samples.
5. An FIR filter applies an optional, user-defined filter to the samples.
6. A volume ramp applies a volume ramp across samples for volume envelope articulation.
7. A mixer mixes the samples at a 32 kHz sampling rate with 24-bit precision.

Steps 1–7 are repeated for each voice. When all of the voices have been processed and accumulated in the mixer buffer, the following steps occur:
1. Dolby surround and main processor-based effects (such as reverb or chorus) are applied to the mixed voices. Applying main processor-based effects is described in detail in Application Ser. No. 09/643,981 entitled "Method and Apparatus for Mixing Sound Signals", the contents of which are incorporated herein by reference.
2. The samples are truncated from 24-bit to 16-bit precision, the data is converted to a 48 kHz sample rate for output by the audio codec 122, and the result is output to main memory 112.

Figure 8:
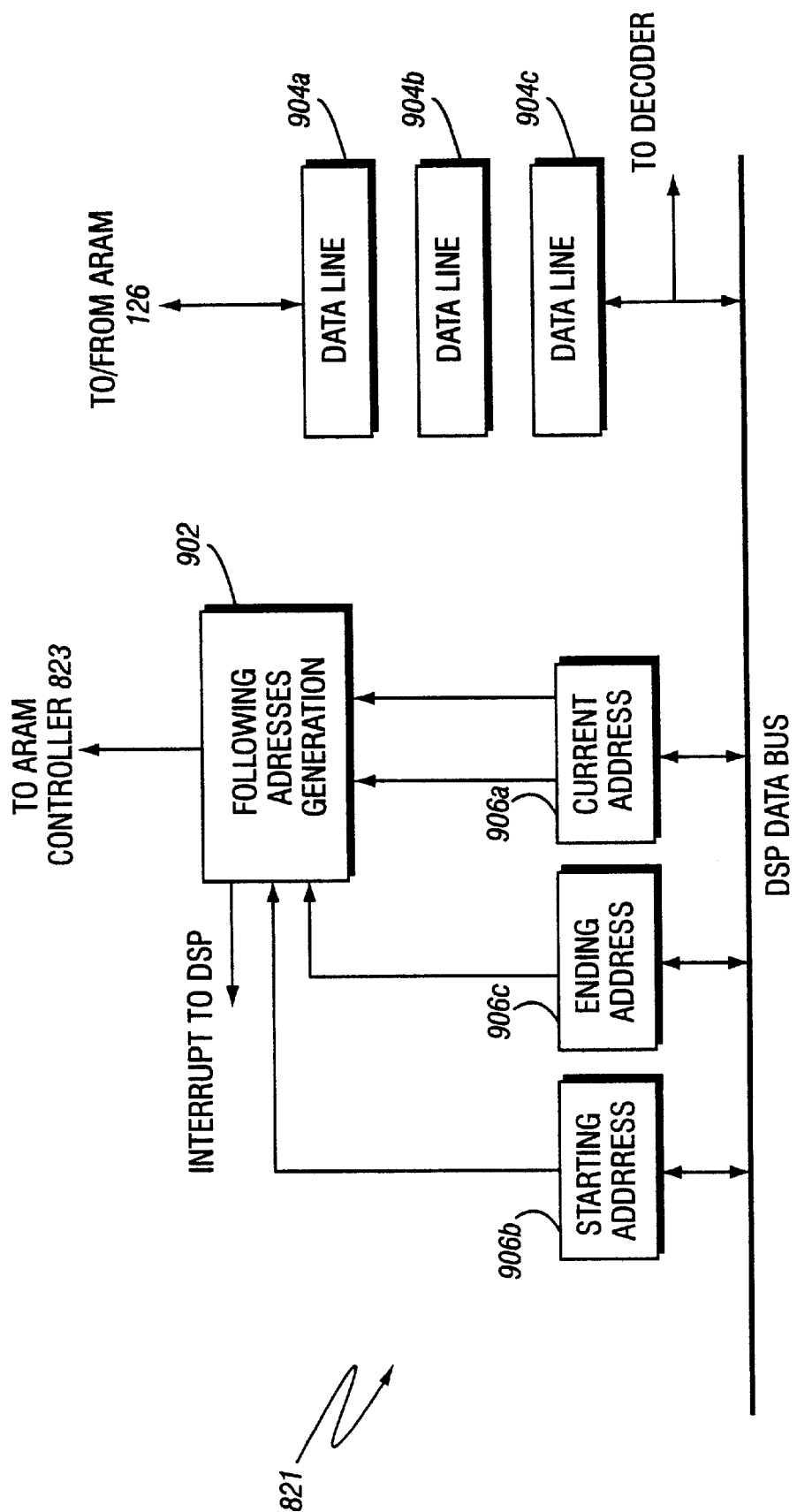
FIG. 8 is a block diagram of accelerator 821.

FIG. 8 is a block diagram of accelerator 821. As mentioned above, accelerator 821 is used instead of DSP core 811 to read from and write to audio memory 126. Accelerator 821 includes a following addresses generating circuit 902 for automatically increasing the address or generating a wrap around address (circular addressing) for the next access. Accelerator 821 includes three data lines 904a–904c that function as pre-fetch buffers during read operations and as write buffers during write operations. As will be explained below, data lines 904a–904c hide the access latency of audio memory 126 when operations of DSP core 811 access audio memory 126. An interrupt to DSP core 811 is generated when data of the starting address is read by the DSP or when data of the ending address is written to the data lines by the DSP.

Three parameter registers (current address, starting address, ending address) 906a–906c are used to define a circular buffer in the memory space of audio memory 126. Each parameter register is 27 bits wide and can be read/write by the audio DSP. Following addresses generation circuit 902 adds "1" to the current address to obtain the next address. If the current address is equal to the ending address, then the next address is the starting address. Parameter registers 906a–906c are used for reading from and writing to audio memory 126. The relationship between the addresses and the data in the registers is as follows:

| Bits | Name | Type | Reset | Description |
|---|---|---|---|---|
| ACCAH: Accelerator aram Current Address High DSP Address:0xFFD8 | | | | |
| 15 | Direction | R/W | 0x0 | 0:accelerator read ARAM 1:accelerator write ARAM |
| 14 ... 11 | | R | 0x0 | Reserved |
| 10 ... 0 | Current address | R/W | 0x0 | Bit 26 to bit 16 of ARAM high-word current address |
| ACCAL: Accelerator aram Current Address Low DSP Address:0xFFD9 | | | | |
| 15 ... 0 | Current address low-word | R/W | 0x0 | Bit 15 to Bit 0 of ARAM current address |
| ACEAH: Accelerator aram Ending Address High DSP Address:0xFFD6 | | | | |
| 15 ... 11 | | R | 0x0 | Reserved |
| 10 ... 0 | Ending address high-word | R/W | 0x0 | Bit 26 to bit 16 of ARAM ending address |
| ACEAL: Accelerator aram Ending Address Low DSP Address:0xFFD7 | | | | |
| 15 ... 0 | Ending address low-word | R/W | 0x0 | Bit 15 to bit 0 of ARAM ending address |
| ACSAH: Accelerator aram Starting Address High DSP Address:0xFFD4 | | | | |
| 15 ... 11 | | R | 0x0 | Reserved |
| 10 ... 0 | Starting address high-word | R/W | 0x0 | Bit 26 to bit 16 of ARAM starting address |
| ACSAL: Accelerator aram Starting Address Low DSP Address:0xFFD5 | | | | |
| 15 ... 0 | Starting address low-word | R/W | 0x0 | Bit 15 to bit 0 of ARAM starting address |

Data lines 904a–904c are each 16 bits in width. For read operations, the data lines function as pre-fetch data buffers in which data is read from audio memory 126 in advance and is ready to deliver as DSP core 811 reads the data lines. For write operations, the data lines functions are temporary buffers for the data from DSP core 811 that is to be written to audio memory 126. Data lines 904a–906c are formed in a FIFO manner, the in/out port thereof being readable/writeable by DSP core 811. The addresses of the data in the data lines correspond to the current address and its two following addresses.

Figure 9A:
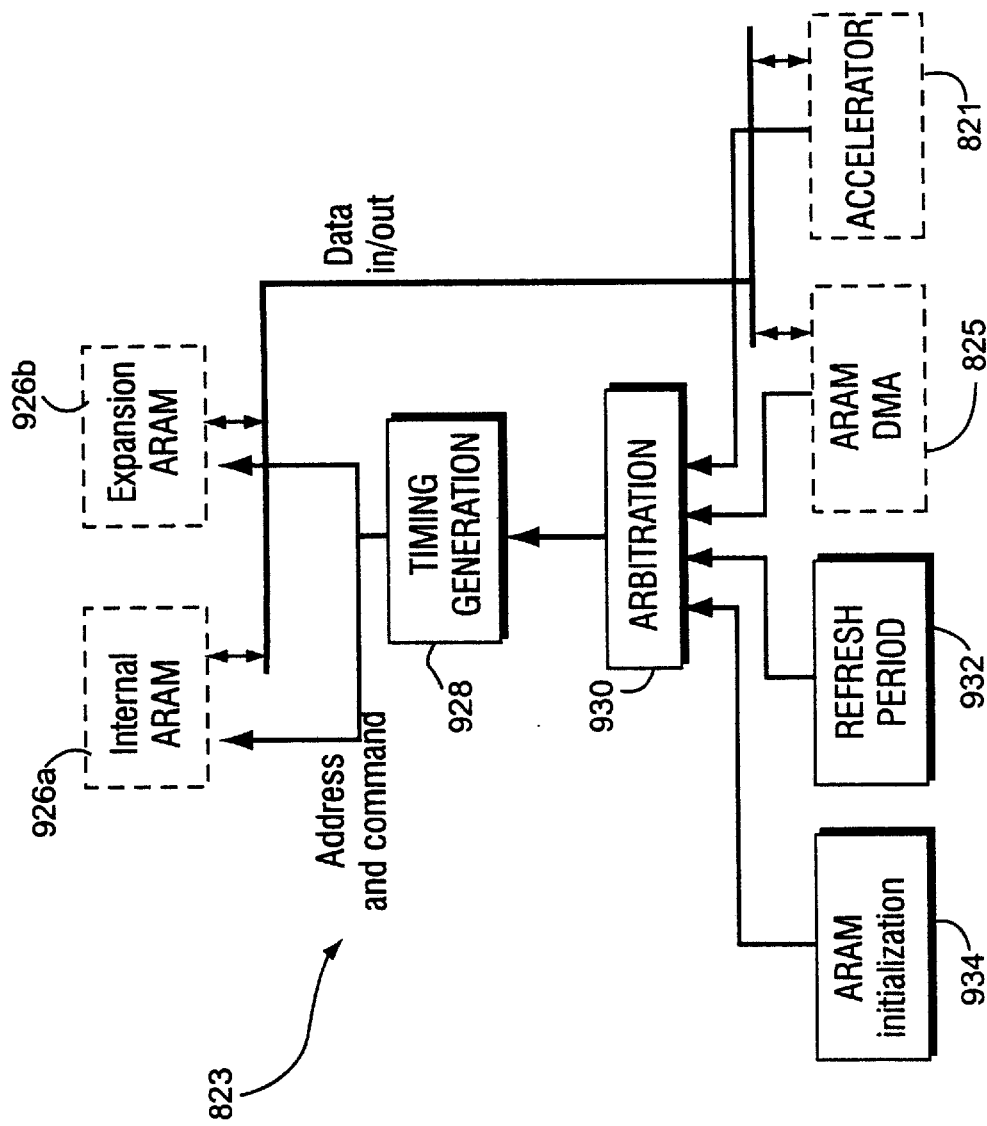
FIG. 9A is a detailed block diagram of audio memory controller 823.

FIG. 9A is a detailed block diagram of audio memory controller 823. Audio memory controller 823 performs the following functions:

After reset, provides audio memory initial timing generation to stabilize audio memory (includes audio memory mode setting);

Generates audio memory refresh cycles; and

Accepts read/write requests of DMA 825 and accelerator 821 and then generates access timing to audio memory 126.

A timing generation circuit 928 generates the access timing. In the example system, there are up to two memory devices that make up audio memory 126. The first is internal audio memory 926a and has a maximum size of 8 Mbyte. The second is expansion audio memory 926b and has a maximum size of 32 Mbyte. The addresses of internal audio memory 926a start from 0, and the addresses of expansion audio memory 926b are cascaded onto the ending address of the internal audio memory. Thus, the address spaces of internal audio memory 926a and expansion audio memory 926b are consecutive and the starting address of expansion audio memory 926b depends on the size of internal audio memory 926a. The mode setting and refresh cycles of internal audio memory 926a and expansion audio memory 926b are active simultaneously.

After a reset, audio memory controller 823 initializes audio memory 126 (as represented by "ARAM initialization" 934 in FIG. 9). During initialization, controller 823 masks any access to audio memory 126; after initialization, audio memory 126 is freely accessible. A flag ARAM__

NORM may be set as an indication that initialization has been performed. As mentioned above, the initialization includes audio memory mode setting. The following settings may be set in an audio memory mode register:

Burst length (e.g., 2 bytes),
Addressing mode (e.g., sequential),
CAS latency (2 or 3—programmed by main processor 110), and
Write mode (burst read and burst write).

Audio memory controller 823 initializes internal audio memory 926a and expansion audio memory 926b simultaneously. Main processor 110 programs CAS latency before initialization is finished. If CAS latency is not programmed by main processor 110, the reset default CAS=3 is used to access audio memory 126.

After initialization, audio memory controller 823 determines the sizes of internal audio memory 926a and expansion audio memory 926b.

Except for a chip select signal, internal audio memory 926a and expansion audio memory 926b share the same address bus, data bus and control signals. During operation, an arbitration unit 930 generates access timing for three requesters:

DMA 825,
Accelerator 821, and
Refresh counter 932.

The priority among these requesters is as follows:

Refresh counter 932>accelerator 821>DMA 825

The auto refresh period is programmable and audio memory controller 823 provides refresh cycles to internal audio memory 926a and expansion audio memory 926b at the same time.

The following DSP-programmed bit can be used to mask access to audio memory 126 by DMA 825:

| AMDM:Ara_M-Dma request Mask DSPaddress: 0xFFEF | | | | |
|---|---|---|---|---|
| Bits | Name | Type | Reset | Description |
| 15 . . . 1 | | R | 0x0 | Reserved |
| 0 | DMA request mask | R/W | 0x0 | 0: DMA request ARAM is unmasked<br>1: DMA request ARAM is masked |

If bit 0 of AMDM is set, access to audio memory 126 is dedicated to accelerator 821. If bit 0 of AMDM is clear, the following process occurs.

Typically, DMA 825 accesses audio memory 126 via a plurality (e.g., 16) of read/write commands. If accelerator 821 needs to access audio memory 126 during this time, audio memory controller 823 determines whether both are attempting to access the same bank of audio memory 126. If so, audio memory controller 823 terminates (precharges) access by DMA 825 and transfers access to accelerator 821. After accelerator 821 finishes, audio memory controller 823 transfers access back to DMA 825 and DMA 825 executes (activate first) the rest of its read/write commands.

If accelerator 821 and DMA 825 are accessing different banks, an interleaved bank access scheme is utilized to realize better performance on access transfer between accelerator 821 and DMA 825. In this scheme, audio memory controller 823 does not precharge (terminate) the DMA bank, leaving it on waiting. Access to audio memory 126 is then transferred to accelerator 821. After accelerator 821 finishes its access of audio memory 126, audio memory controller 823 executes (no need to activate first) the rest of the read/write commands of DMA 825.

If access of audio memory 126 crosses a 512 byte boundary (different row), audio memory controller 823 precharges the current row to end access and activates the next row to start access. This increases the number of cycles to read/write data. The interleaved bank scheme described above is preferably not provided for DMA-access-cross-row or accelerator-access-cross-row.

Accelerator 821 includes three addressing modes (4 bit, 8 bit and 16 bit) for read operations and 1 addressing mode (16 bit) for write operations. The different read addressing modes are usable to read compressed data of different formats (e.g., ADPCM, 8-bit PCM) and to read uncompressed data. In the 4-bit (nibble) addressing mode, data is "nibble" addressable. The LSBit (bit 0) unit of each parameter register (bit 26 to bit 0) is nibble and b1, b0 of the current address are used to select the nibble of the data line. The example audio system hardware uses bit 26 to bit 2 and cascades a "0" as a 26-bit audio memory access address. In the 8-bit (byte) addressing mode, the data is "byte" addressable. The LSBit (bit 0) unit of each parameter register (bit 26 to bit 0) is byte, and bit 0 of the current address is used to select the byte of the data line. The example audio system hardware uses bit 25 to bit 1 and cascades a "0" as a 26-bit audio memory access address. In the 16-bit (word) addressing mode, the data is "word"addressable. The LSBit (bit 0) unit of each parameter register (bit 26 to bit 0) is word and data in the audio memory is allocated in word boundary. The example audio system uses bit 24 to bit 0 and cascades "0" as a 26-bit audio memory access address.

The data translation among the audio memory, accelerator 825 and audio DSP 156 is as follows:

4-bit addressing mode

| Audio memory | BYTE 0 | | BYTE 1 | |
|---|---|---|---|---|
| Data Line | Bit 15 . . . 12 | Bit 11 . . . 8 | Bit 7 . . . 4 | Bit 3 . . . 0 |
| DSP xx . . 00 | 000000000000 | | | Bit 15 . . . 12 |
| DSP xx . . 01 | 000000000000 | | | Bit 11 . . . 8 |
| DSP xx . . 10 | 000000000000 | | | Bit 7 . . . 4 |
| DSP xx . . 11 | 000000000000 | | | Bit 3 . . . 0 |

8-bit addressing mode

| Audio memory | BYTE 0 | | BYTE 1 | |
|---|---|---|---|---|
| Data Line | Bit 15 . . . 12 | Bit 11 . . . 8 | Bit 7 . . . 4 | Bit 3 . . . 0 |
| DSP xx . . x0 | 00000000 | | Bit 15 . . . 8 | |
| DSP xx . . x1 | 00000000 | | Bit 7 . . . 0 | |

-continued 16-bit addressing mode

| Audio memory | BYTE 0 | | BYTE 1 | |
|---|---|---|---|---|
| Data Line | Bit 15...12 | Bit 11...8 | Bit 7...4 | Bit 3...0 |
| DSP..xx | Bit 15...0 | | | |

Of course, the number and type of addressing modes are provided as illustrations and the invention is not limited in this respect. The addressing mode is programmable by the DSP core 811.

Figure 9B:
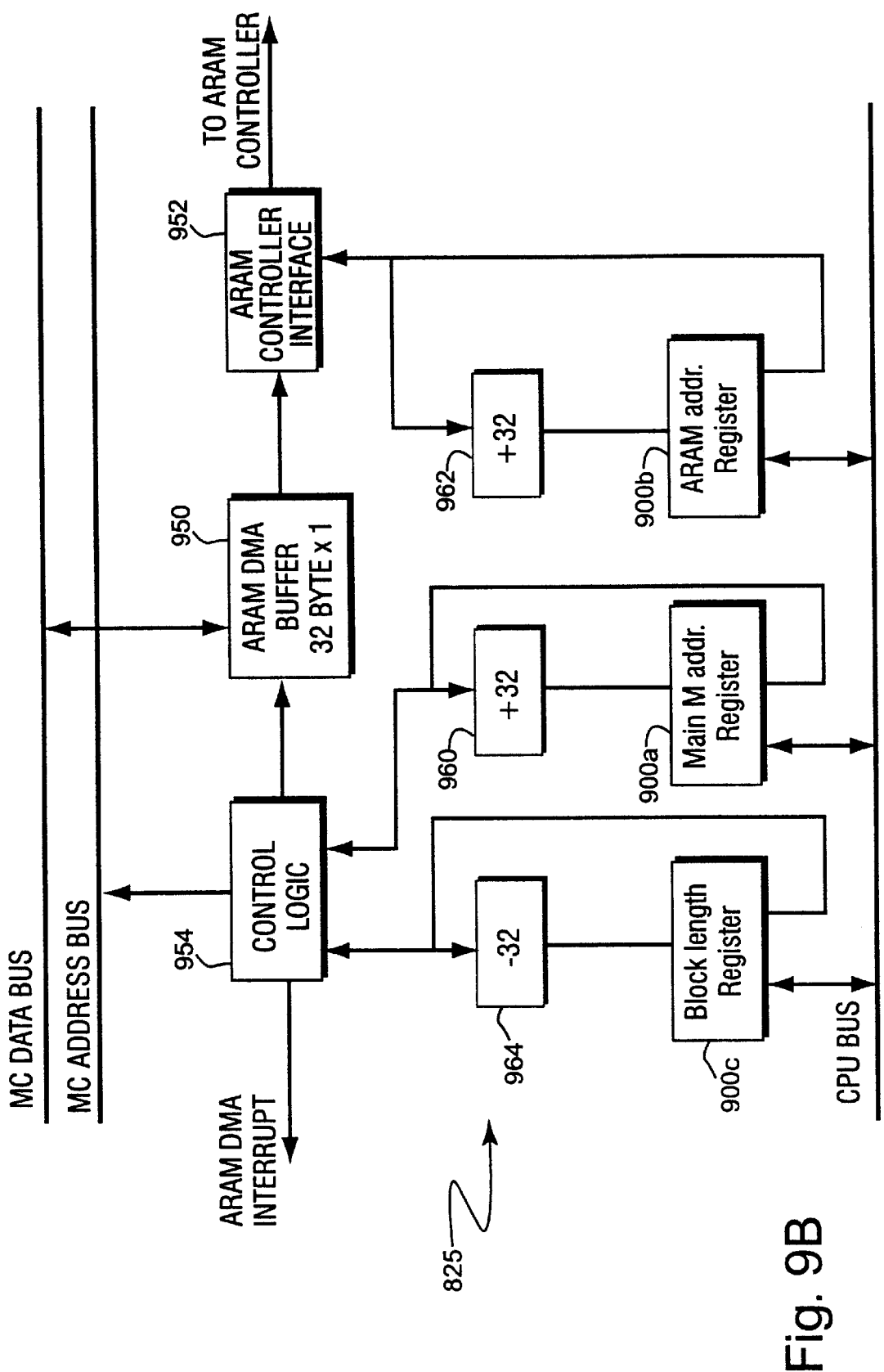
FIG. 9B is a detailed block diagram of audio memory DMA 825.

The details of the audio memory DMA 825 are shown in FIG. 9B. Audio memory DMA 825 includes three registers 900a–900c that are used to define main memory starting address, audio memory starting address, and the block length and the direction of the DMA transfer, respectively. Main processor 110 programs these registers. The registers are 32-bits wide and the DMA transfer direction is specified by bit 15 of the high word of the block length register. The starting address of each side (i.e., main memory 112, audio memory 126) is located at 32 byte boundary and the block length is a multiple of 32 bytes. During DMA transfer, these registers are modified by each memory controller block access. There is a one memory controller size (32 byte) data buffer 950 built into the audio memory DMA to bridge the unequal bandwidth memories.

The operation flow of main memory 110 to audio memory 126 includes the following steps:

1. A write to the low word of block length register 900c triggers DMA 825 as ready to transfer data.
2. DMA 825 sends a read request to memory controller 152 (FIG. 3) and then waits for 32 byte data coming to DMA data buffer 950.
3. Once the 32 byte data is moved into data buffer 950, DMA 825 sends a write request to arbitration circuit 930 (see FIG. 9A) and waits for transfer. Main memory address register 900a is also increased by 32 by address incrementing circuit 960.
4. If DMA 825 is granted access to audio memory 126 by arbitration circuit 930, a write command is sent to audio memory 126 and data starts to move from DMA data buffer 950 to audio memory 126 byte by byte, until 32 bytes have been moved (buffer empty). The audio memory address is increased by 32 by audio address incrementing circuit 962 and the block length is decreased by 32 by block length decrementing circuit 964.
5. Steps 2 through 4 are repeated until the block length reaches 0. At this point, DMA 825 stops and control logic 954 sets up a flag and generates an interrupt to main processor 110. The interrupt is maskable.

The operation flow of audio memory 126 to main memory 110 includes the following steps:

1. A write to the low word of block length register triggers DMA 825 ready to transfer data.
2. DMA 825 sends a read request to arbitration circuit 930 (see FIG. 9A) and then waits for 32 byte data.
3. If DMA 825 is granted access to audio memory 126 by arbitration circuit 930, a read command is sent to audio memory 126 and data starts to move from audio memory 126 to DMA data buffer 950 byte by byte until 32 bytes have been moved into the data buffer. The audio memory address in audio memory address register 900b is then increased by 32 by audio address incrementing circuit 962.
4. Once 32 byte data is moved into DMA data buffer 950, DMA 825 sends a write request to memory controller 152. The 32 byte data is then moved from DMA data buffer 950 to the memory controller bus. After this, the address of main memory 110 is increased by 32 by main memory address incrementing circuit 960 and the block length is decreased by 32 by clock length decrementing circuit 964.
5. Steps 2 through 4 are repeated till the block length reaches 0. At this point, DMA 825 stops and control logic 954 sets up a flag and generates an interrupt to main processor 110. The interrupt is maskable.

Arbitration is performed before each 32 byte transfer. The memory controller bus arbitration priority is as follows:

AI DMA 805>DSP DMA 819>ARAM DMA 825

Reading Operation

Before DSP core 811 starts reading data lines, the starting and ending address, the high word of the current address, and then the low word of the current address are set. Once the low word of the current address register is loaded by DSP core 811, the read/write operation mode is set by bit 15 of the high word current address register. If the read mode is specified, three words of data are "pre-fetched" from the audio memory 126 to the data lines 904a–904c. The pre-fetched data corresponds to data for the current address and the next following two addresses.

There is typically a latency (e.g., about 10 cycles) from the time the low word current address is loaded until the time that data is available on the data lines. During the latency period, accelerator 821 halts operation of DSP core 811 until the first data is available. Also during the latency period, reading and writing to the parameter registers 906a–906c is not allowed.

The current address is incremented by one after the DSP reads one of the data lines. Once the last data of the active data line is read, the active data line is switched to the next line, meaning that one line is now empty. Data for the following address is then pre-fetched.

If the data in the lines is being read by DSP core 811 and the address is equal to the starting address, an interrupt is generated to DSP core 811. This interrupt is maskable by DSP core 811.

Writing Operation

Before DSP 811 starts writing data lines, starting and ending addresses, the high word of the current address and then the low word of the current address are set in parameter registers 906a–906c. Once the low word of the current address register is loaded by DSP core 811 with bit 15=1, the accelerator is set in write operation mode. Once data is available in data lines 904a–904c, accelerator 821 stores the data in the lines to the audio memory 126 by the current address and its following addresses until the data lines are empty. If data from the data lines is being stored in audio memory 126 and the current address is equal to the ending address, accelerator 821 generates an interrupt to DSP core 811. This interrupt is maskable by DSP core 811. During the write operation, if any of the parameter registers are accessed for read/write, accelerator 821 halts DSP core operation until the data lines are empty. In this example, the write mode of accelerator 821 is always 16-bit.

The pre-fetch operation during reading is particularly useful when a sound sample is provided with loop points.

Figure 12A:
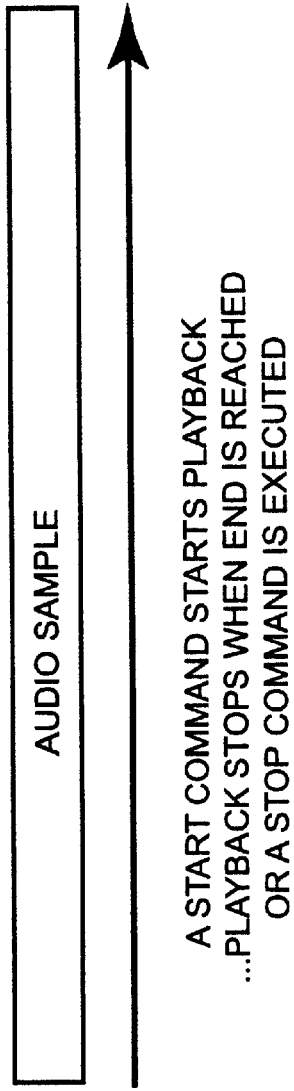
FIG. 12A and 12B illustrate one-shot playback and looped playback, respectively.
Figure 12B:
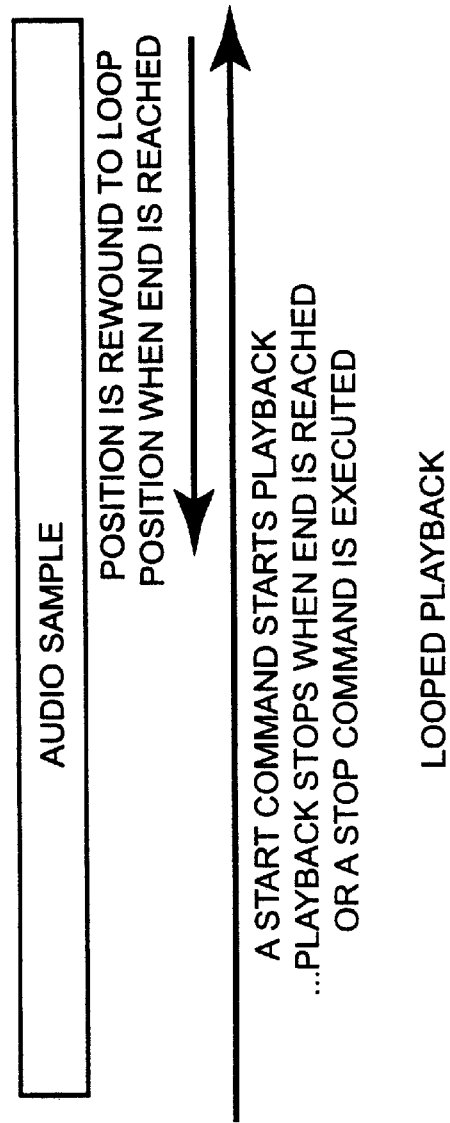

Pre-recorded sound samples (e.g., sounds for an instrument such as a piano) are typically stored as files in a particular format (e.g., WAV or AIFF). As noted above, sound samples may be played from beginning to end ("one-shot playback") as shown in FIG. 12A or sound samples may be "looped" (possibly with envelope reduction) so that the position is "rewound" to a loop position when the end of the sample is reached as shown in FIG. 12B. Looped playback is advantageous inasmuch as the replaying of a portion of the sample permits reductions in the size of the sample. Nonetheless, the rewinding to a previous point in the audio file containing the sample results in delays in accessing the file while the memory addressing circuitry is updated to point to the loop position. In particular, reading out data from a memory is most efficient when the memory is addressable by simple increments of a current address. However, loop back requires the memory addressing circuitry to be reset to the loop position, and to be repeatedly reset to the loop position if loop back occurs more than once. While incrementing address registers to read data at a next sequential file address can be performed quickly, resetting these registers takes a longer time and can result in a latency period between the output of the data at the last pre-loop-back address and the output of the data at the loop-back address. This can result in interruptions and corruptions of the audio output and a reduction in the number of voices that can be reproduced. All of these adversely impact the player's gaming experience. The pre-fetching of data from audio memory 126 as described above reduces the possibility of corrupted audio output. Because pre-fetched data is already present when the address registers are re-set, the audio digital signal processor can continue reading data during the latency period when the memory address is reset to the loop-back address.

Of course the use of three data lines as a read/write buffer is provided by way of example, not limitation, and the present invention is not limited to any particular number of data lines as a read/write buffer. Generally speaking, the number of data lines should be sufficient to allow pre-fetching of an amount of is enough data to mask the latency associated the re-setting of the address registers during looped-playback of audio files. In addition, while the invention is described above in terms of latencies associated with looped-playback, the pre-fetching technique may be applied to mask latencies associated with other operations for reading data from the audio memory.

Figure 10A:
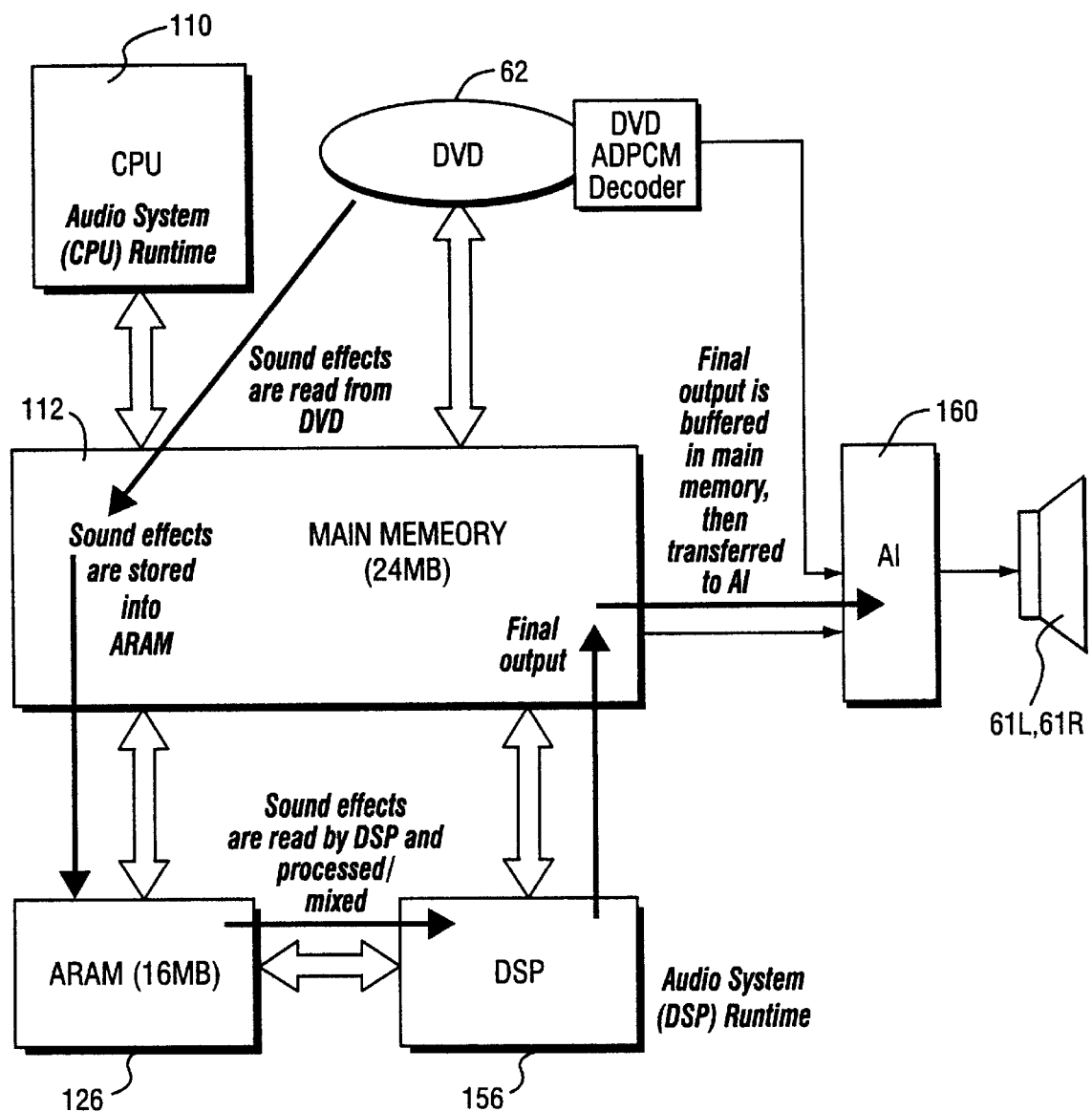
FIGS. 10A and 10B illustrate data flow and control flow, respectively, for reproducing sounds.
Figure 10B:
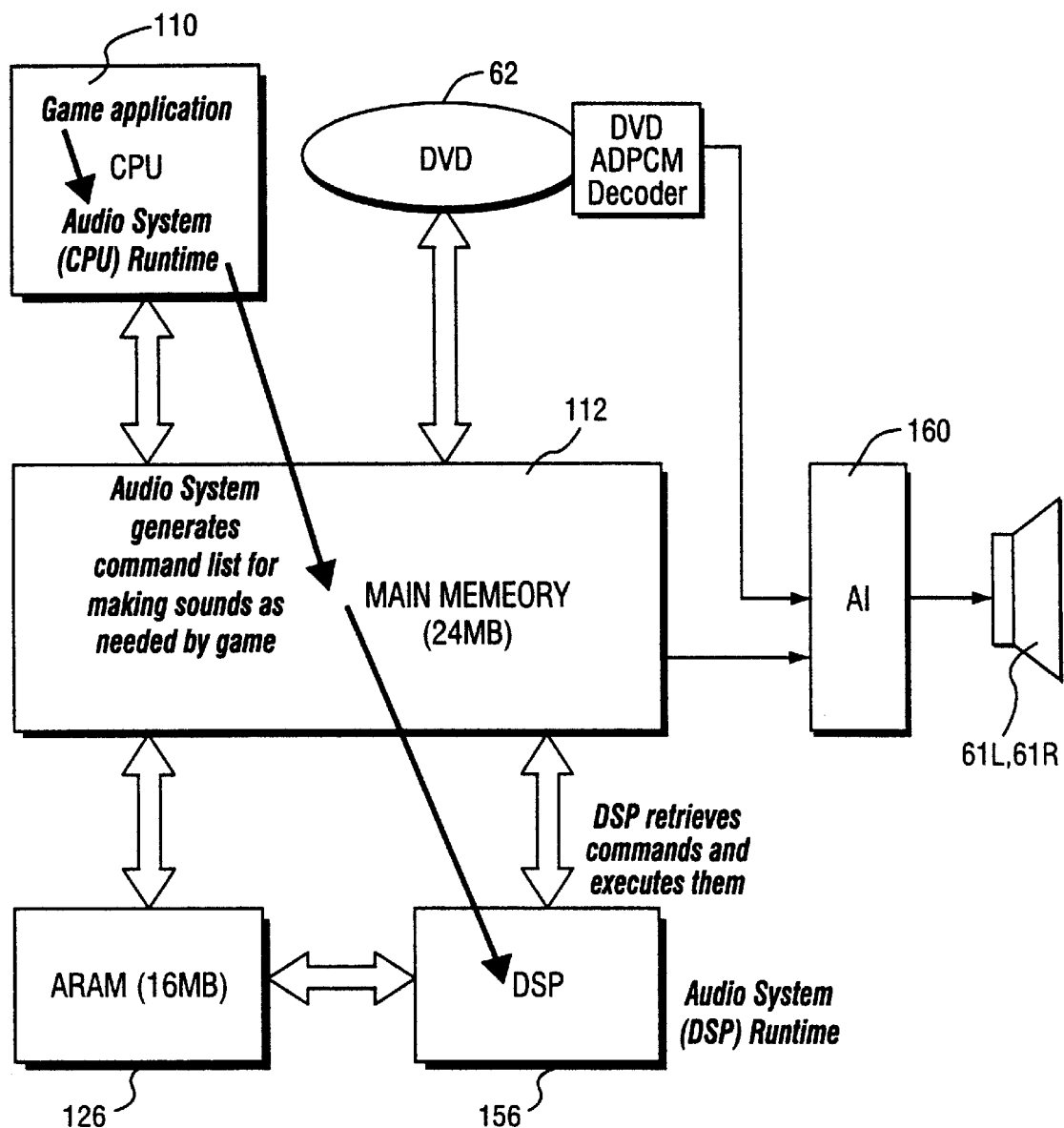

FIGS. 10A and 10B illustrate data flow and control flow, respectively, for reproducing sounds. As shown in FIG. 10A, sound samples are read from mass storage device 62 into main memory 112 via peripheral (I/O) controller 162 and from main memory 112 into audio memory 126 via ARAM DMA 825. The sound samples are read by DSP core 811 via accelerator 821 and DSP core 811 processes/mixes the sound samples. The processed/mixed sound samples are buffered in main memory 112 and then transferred to audio interface FIFO 807 for output to speakers 61L, 61R via audio codec 122. As shown in FIG. 10B, the game application ultimately dictates the need for sound. The game application makes a call to the audio system runtime application which generates a command list for audio DSP 156. In executing the command list, audio DSP 156 retrieves the appropriate sound sample and processes it as needed.

The data and control flow for music synthesis is similar to that for sound samples shown in FIG. 10A. The instrument wavetable from mass storage device 62 is stored in audio memory 126 via main memory 112. Audio DSP 156, upon receiving commands generated by the audio system (main processor) run time application, retrieves the necessary instrument samples, processes and mixes them, and stores the result in main memory 112. From there, the result is transferred to audio interface FIFO 807 for output to speakers 61L, 61R via audio codec 122. The commands generated by the audio system (main processor) run time application are driven by the music score which is read from mass storage device 62 into main memory 112 and which is processed and sequenced by the audio system (main processor) run time application according to the demands of the game.

The audio system (main processor) run time application may also manage the playback and mixing of audio tracks to provide software streaming. Software streaming allows the simultaneous playback of one or more audio tracks, which provides a degree of interactivity. The game may, for example, fade from one track into another to influence the player's mood. In general, the different audio tracks are buffered in audio memory 126 as individual sound samples. Audio DSP 156 may then retrieve the tracks and mix them just as it would any other voice.

The runtime audio library includes a resource management algorithm that monitors resource usage of audio DSP 156 and dynamically limits voice allocation accordingly. This prevents audio DSP 156 from becoming overburdened, which may result in corrupted audio output. Preferably, the resource management algorithm assumes worst-case memory access latencies to further ensure smooth, continuous audio. For example, up to 64 voices may be supported, depending on the mixing and processing requirement of each voice.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of system 50. The DSP processing of the above-described audio system could be emulated on a personal computer.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 11A:
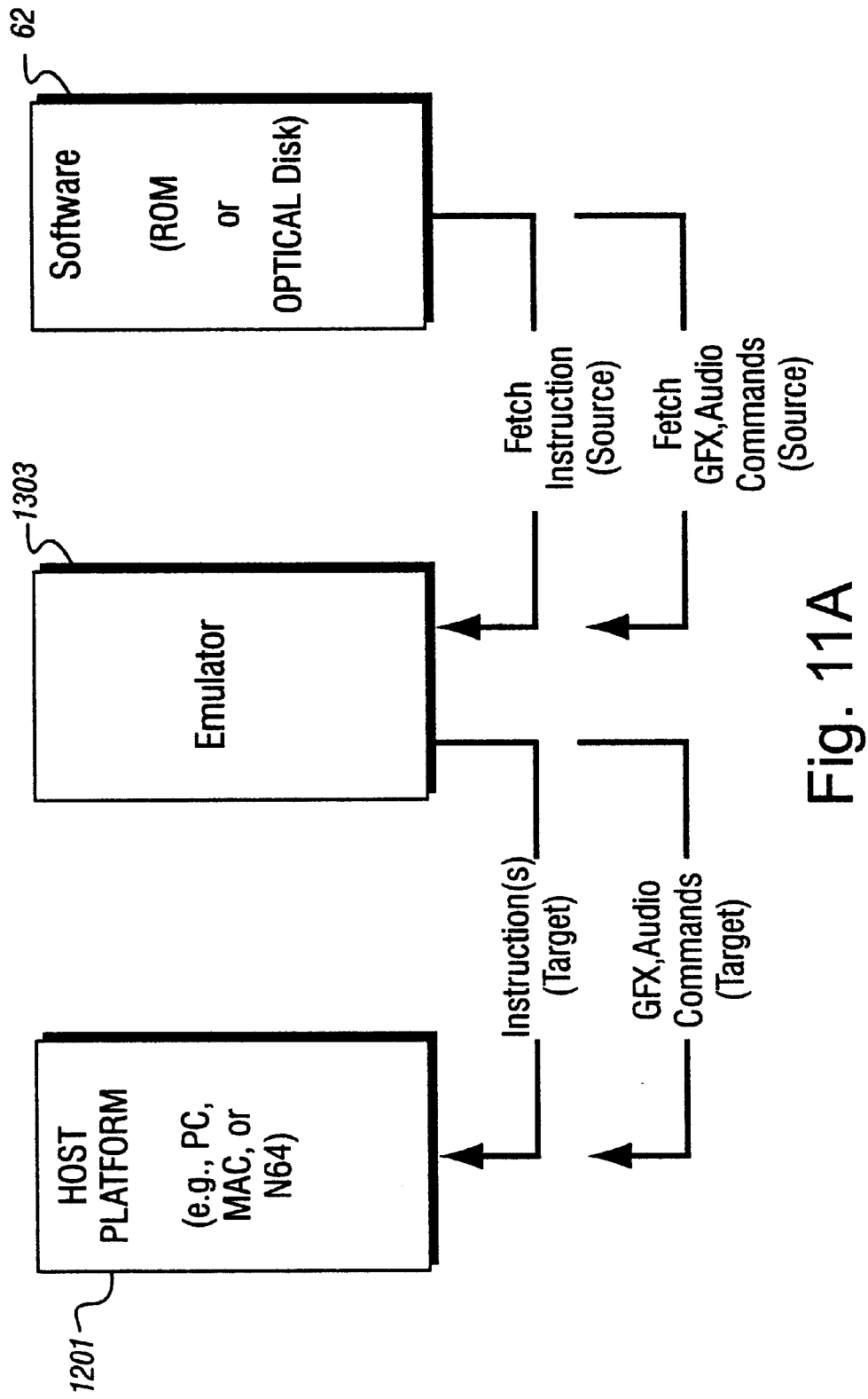
FIGS. 11A and 11B show example alternative compatible implementations.

FIG. 11A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 11B:
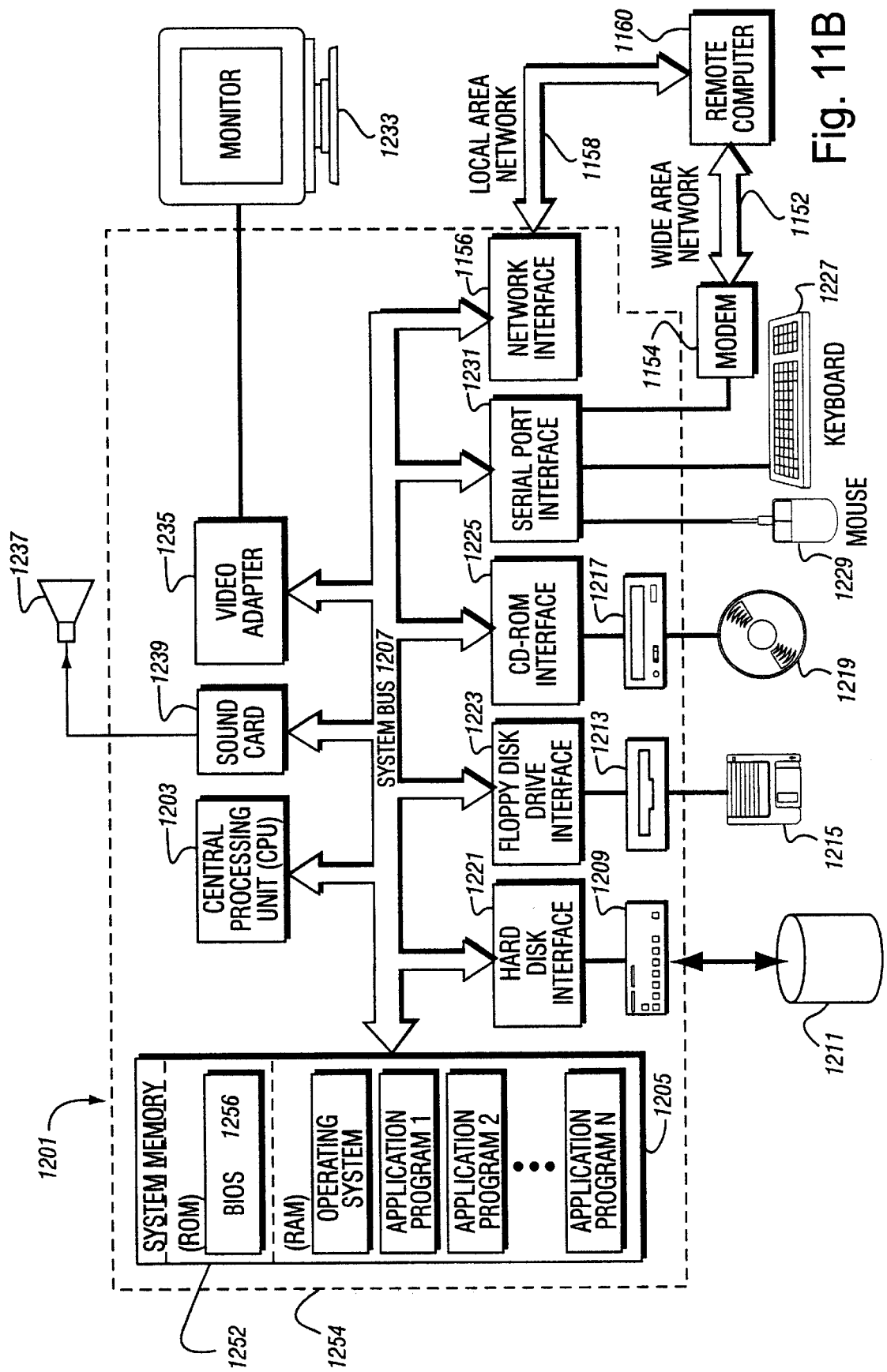

FIG. 11B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

I claim:

1. An audio system comprising:

a memory storing a sound sample;

an audio signal processor for processing the sound sample;

addressing circuitry for addressing the memory to read the sound sample therefrom, the addressing circuitry addressing the memory from a first address to a second address and then looping back one or more times to a third address between the first and second addresses; and a pre-fetch storage area for storing data for a current address and for one or more following addresses to hide memory access latency during the looping back of the addressing circuitry to the third address, wherein the addressing circuitry comprises a starting address register, an ending address register and a current address register.

2. The audio system according to claim 1, wherein the addressing circuitry is operable in a plurality of different addressing modes for reading the sound sample from the memory.

3. The audio system according to claim 2, wherein one of the addressing modes is a 4-bit addressing mode.

4. The audio system according to claim 2, wherein one of the addressing modes is an 8-bit addressing mode.

5. The audio system according to claim 2, wherein one of the addressing modes is a 16-bit addressing mode.

6. The audio system according to claim 2, wherein the addressing circuitry is operable in one of a 4-bit, an 8-bit and a 16-bit addressing mode.

7. The audio system according to claim 1, wherein the starting address register, the ending address register and the current address register can be read/written by the audio digital signal processor.

8. The audio system according to claim 1, wherein the addressing circuitry further comprises address generating circuitry for generating addresses for addressing the memory based on the contents of the starting address register, the ending address register and the current address register.

9. The audio system according to claim 1, wherein the pre-fetch storage area operates as a FIFO.

10. The audio system according to claim 1, wherein the pre-fetch storage area stores pre-fetched data for the next two addresses after the current address.

11. The audio system according to claim 1, wherein the pre-fetch storage area comprises a plurality of data lines organized as a FIFO.

12. The audio system according to claim 1, further comprising a decoder for decoding data supplied thereto from the pre-fetch storage area.

13. An audio system comprising:

a memory storing a sound sample;

an audio signal processor for processing the sound sample;

addressing circuitry for addressing the memory to read the sound sample therefrom, the addressing circuitry addressing the memory from a first address to a second address and then looping back one or more times to a third address between the first and second addresses; and a pre-fetch storage area for storing data for a current address and for one or more following addresses to hide memory access latency during the looping back of the addressing circuitry to the third address, wherein the addressing circuitry comprises a current address register which includes a bit for determining read/write access to the memory.

14. The audio system according to claim 13, further comprising a decoder for decoding data supplied thereto from the pre-fetch storage area.

15. An audio system comprising:

a memory storing a sound sample;

an audio signal processor for processing the sound sample;

addressing circuitry for addressing the memory to read the sound sample therefrom, the addressing circuitry addressing the memory from a first address to a second address and then looping back one or more times to a third address between the first and second addresses; and a pre-fetch storage area for storing data for a current address and for one or more following addresses to hide memory access latency during the looping back of the addressing circuitry to the third address, wherein the pre-fetch storage area is three data lines.

16. The audio system according to claim 15, further comprising a decoder for decoding data supplied thereto from the pre-fetch storage area.

17. A method of reading an audio sample from a memory for processing by an audio digital signal processor comprising:

addressing the memory from a first address to a second address and then looping back one or more times to a third address between the first and second addresses to read the audio sample; and storing data for a current address and for one or more following addresses in a pre-fetch storage area to hide memory access latency during the looping back to the third address, wherein the addressing comprises reading/writing from/to a starting address register, an ending address register and a current address register.

18. The method according to claim 17, wherein the memory is addressed in one of a plurality of different addressing modes.

19. The method according to claim 17, wherein one of the addressing modes is a 4-bit addressing mode.

20. The method according to claim 17, wherein one of the addressing modes is an 8-bit addressing mode.

21. The method according to claim 17, wherein one of the addressing modes is a 16-bit addressing mode.

22. The method according to claim 17, further comprising:

decoding data from the pre-fetch storage area.

23. A video game machine comprising:

a mass storage access device for accessing a mass storage device storing a video game program;

a video game program executing system for executing the video game program;

a memory for storing a sound sample for the video game program;

an audio digital signal processor for processing the sound sample;

addressing circuitry for addressing the memory to read the sound sample therefrom, the addressing circuitry addressing the memory from a starting address to an ending address and then looping back one or more times to a loop address between the starting and ending addresses, wherein the addressing circuitry comprises a starting address register, an ending address register and a current address register; and a storage area for storing data for a current address and for one or more following addresses to hide memory access latency during the looping back of the addressing circuitry to the loop address.

24. The video game machine according to claim 23, further comprising:

a decoder for decoding data supplied thereto from the storage area.

25. The video game machine according to claim 23, wherein the addressing circuitry is operable in a plurality of different addressing modes.

26. The video game machine according to claim 23, wherein the addressing circuitry is selectively operable in a 4-bit, an 8-bit and a 16-bit addressing mode.

27. The video game machine according to claim 23, wherein the storage area is a plurality of data lines.

28. The video game machine according to claim 23, wherein the starting address register, the ending address register and the current address register are readable and writable by the audio digital signal processor.

29. A method for a video game machine comprising a mass storage access device for accessing a mass storage device storing a video game program, a video game program executing system for executing the video game program, a memory for storing a sound sample for the video game, an audio digital signal processor for processing the sound sample, and addressing circuitry for addressing the memory to read the sound sample therefrom, wherein the addressing circuitry comprises a starting address register, an ending address register and a current address register, the method comprising:

addressing the audio memory from a starting address specified in the starting address register to an ending address specified in the ending address register and then looping back one or more times to a loop address between the starting and ending addresses to read the sound sample; and storing data for a current address and for one or more following addresses in a storage area to hide memory access latency during the looping back to the loop address.

30. The method according to claim 29, wherein the memory is selectively addressed in one plurality of different addressing modes.

31. The method according to claim 29, wherein the memory is selectively addressed in one of a 4-bit, an 8-bit and a 16-bit addressing mode.

32. The method according to claim 29, further comprising:

decoding data from the storage area.

33. A video game machine comprising:

mass storage access means for accessing a mass storage device storing a video game program;

video game program executing means for executing the video game program;

memory for storing a sound sample for the video game program;

audio digital signal processing means for processing the sound sample;

addressing means for addressing the audio memory to read the sound sample therefrom, the addressing means addressing the audio memory from a starting address to an ending address and then looping back from the ending address one or more times to a loop address between the starting and ending addresses, wherein the addressing means comprises a starting address register, an ending address register and a current address register; and storing means for storing data for a current address and for one or more following addresses to hide memory access latency during the looping back of the addressing means to the loop address.

* * * * *